United States Patent
Fry et al.

(10) Patent No.: US 12,503,542 B2
(45) Date of Patent: Dec. 23, 2025

(54) CHAIN SCISSION TO MAKE IMPROVED POLYMERS FOR 3D PRINTING

(71) Applicant: LUMAS Polymers LLC, Chaska, MN (US)

(72) Inventors: Thomas Fry, Victoria, MN (US); Zachary Peterson, New Hope, MN (US); Levi Loesch, Minneapolis, MN (US); Luke Rodgers, St. Petersburg, FL (US)

(73) Assignee: Lumas Polymers LLC, Chaska, MN (US)

( * ) Notice: Subject to any disclaimer, the term of this patent is extended or adjusted under 35 U.S.C. 154(b) by 369 days.

(21) Appl. No.: 17/801,342

(22) PCT Filed: Feb. 24, 2021

(86) PCT No.: PCT/US2021/019391
§ 371 (c)(1),
(2) Date: Aug. 22, 2022

(87) PCT Pub. No.: WO2021/173651
PCT Pub. Date: Sep. 2, 2021

(65) Prior Publication Data
US 2023/0159703 A1  May 25, 2023

Related U.S. Application Data

(60) Provisional application No. 62/985,007, filed on Mar. 4, 2020, provisional application No. 62/981,854, filed on Feb. 26, 2020, provisional application No. 62/981,937, filed on Feb. 26, 2020.

(51) Int. Cl.
| | |
|---|---|
| C08F 293/00 | (2006.01) |
| B29C 64/118 | (2017.01) |
| B29C 64/141 | (2017.01) |
| B29K 67/00 | (2006.01) |
| B29K 77/00 | (2006.01) |
| B33Y 10/00 | (2015.01) |
| B33Y 70/00 | (2020.01) |
| C08G 69/48 | (2006.01) |
| C08K 3/013 | (2018.01) |
| C08L 77/02 | (2006.01) |

(52) U.S. Cl.
CPC .......... *C08F 293/00* (2013.01); *B29C 64/118* (2017.08); *B29C 64/141* (2017.08); *B33Y 10/00* (2014.12); *B33Y 70/00* (2014.12); *C08G 69/48* (2013.01); *C08K 3/013* (2018.01); *C08L 77/02* (2013.01); *B29K 2067/00* (2013.01); *B29K 2077/00* (2013.01)

(58) Field of Classification Search
None
See application file for complete search history.

(56) References Cited

U.S. PATENT DOCUMENTS

| | | |
|---|---|---|
| 4,246,378 A | 1/1981 | Kometani et al. |
| 5,121,329 A | 6/1992 | Crump |
| 5,236,637 A | 8/1993 | Hull |
| 5,340,656 A | 8/1994 | Sachs et al. |
| 5,503,785 A | 4/1996 | Crump et al. |
| 5,597,589 A | 1/1997 | Deckard |
| 5,876,550 A | 3/1999 | Feygin et al. |
| 5,959,042 A * | 9/1999 | Bouilloux .......... C08G 59/4014 528/332 |
| 7,544,387 B2 | 6/2009 | Bloom |
| 9,157,007 B2 | 10/2015 | Xu et al. |
| 9,211,678 B2 | 12/2015 | DeSimone et al. |
| 9,453,142 B2 | 9/2016 | Rolland et al. |
| 10,001,641 B2 | 6/2018 | Miller |
| 10,253,195 B2 | 4/2019 | Fenn et al. |
| 10,870,232 B2 | 12/2020 | Martinoni |
| 10,919,229 B2 | 2/2021 | Topolkaraev et al. |
| 2007/0213434 A1* | 9/2007 | Lima ................. C08K 5/0008 524/425 |
| 2014/0141168 A1 | 5/2014 | Rodgers |
| 2018/0029291 A1 | 2/2018 | Matzner et al. |
| 2018/0141268 A1 | 5/2018 | Holt |

(Continued)

FOREIGN PATENT DOCUMENTS

| | | |
|---|---|---|
| CN | 101062981 A | 10/2007 |
| CN | 107652671 A | 2/2018 |

(Continued)

OTHER PUBLICATIONS

Lehmann, D. (2009). Melt Modification of Polyamides. In: Eyerer, P., Weller, M., Hübner, C. (eds) Polymers—Opportunities and Risks II. The Handbook of Environmental Chemistry, vol. 12. Springer, Berlin, Heidelberg. (Year: 2009).*

Eichhorn, K.J. et al., "Characterization of Low Molecular Weight Carboxyl-terminated Polyamides Obtained by Reactive Extrusion of Polyamide 6 With Trimellitic Anhydride." Journal of Applied Polymer Science, John Wiley & Sons, Inc. US, vol. 62, No. 12, Dec. 19, 1996 (8 pages).

International Preliminary Report on Patentability in co-pending International Application No. PCT/US2021/019391 mailed May 6, 2022 (19 pages).

International Preliminary Report on Patentability in co-pending International Application PCT/US2021/019393 mailed May 4, 2022 (11 pages).

(Continued)

*Primary Examiner* — Randy P Gulakowski
*Assistant Examiner* — Holley Grace Hester
(74) *Attorney, Agent, or Firm* — Young Basile Hanlon & MacFarlane, P.C.

(57) ABSTRACT

An end capped condensation polymer may be formed by heating a condensation polymer in the presence of an end capping compound to form cleaved condensation polymer reacting at least a portion of the cleaved condensation polymer with the end capping compound to form the end capped condensation polymer. The end capped condensation polymers may be used to form additive manufactured articles having high solids loading and improved processing due to improved rheological behavior.

20 Claims, No Drawings

(56) References Cited

U.S. PATENT DOCUMENTS

| | | | |
|---|---|---|---|
| 2018/0215871 A1 | 8/2018 | Kalyanaraman et al. | |
| 2018/0264753 A1* | 9/2018 | Kornilovich | C08K 3/013 |
| 2019/0248965 A1 | 8/2019 | Bergmann | |

FOREIGN PATENT DOCUMENTS

| | | |
|---|---|---|
| EP | 00285692 A1 | 10/1988 |
| EP | 1580210 A1 | 9/2005 |
| JP | 2009529602 A | 8/2009 |
| KR | 20190109613 A | 9/2019 |
| WO | 2021092473 A1 | 5/2021 |
| WO | 2021173651 A1 | 9/2021 |
| WO | 2021173652 A1 | 9/2021 |
| WO | 2021173663 A2 | 9/2021 |

OTHER PUBLICATIONS

International Preliminary Report on Patentability in co-pending International Application PCT/US2021/019405 mailed May 4, 2022 (30 pages).

International Search Report and Written Opinion in co-pending International Application PCT/US2021/019393 mailed Aug. 4, 2021 (24 pages).

International Search Report and Written Opinion in co-pending International Application PCT/US2021/019405 mailed Aug. 27, 2021 (26 pages).

International Search Report and Written Opinion in co-pending application PCT/US2021/019391 mailed Aug. 2, 2021 (23 pages).

Rasselet, Damien et al., "Reactive compatibilization of PLA/PA11 Blends and Their Application in Additive Manufacturing." Materials, vol. 12, No. 3, Feb. 5, 2019, p. 485.

Second Written Opinion in co-pending International Application No. PCT/US2021/019391 mailed Jan. 26, 2022 (8 pages).

Second Written Opinion in co-pending International Application PCT/US2021/019393 mailed Jul. 12, 2021 (22 pages).

Second Written Opinion in co-pending International Application PCT/US2021/019405 mailed Feb. 4, 2022 (12 pages).

* cited by examiner

CHAIN SCISSION TO MAKE IMPROVED POLYMERS FOR 3D PRINTING

CROSS-REFERENCE TO RELATED APPLICATIONS

This application is a National Stage 371 entry of PCT/US2021/019391 filed on Feb. 24, 2021, published as WO2021/173651A1, which claims priority to United States Provisional Patent Application No. 62/981,854 filed on Feb. 26, 2020; 62/981,937 filed on Feb. 26, 2020; and 62/985,007 filed on Mar. 4, 2020, all of which are incorporated herein by reference in their entirety for all purposes.

FIELD

The invention relates to polymers and method to make them for use in 3D printing. In particular, the invention relates to cleaving of condensation polymers (e.g., polyamides and polyesters), capping of the cleaved polymers to realize desired stable rheological properties useful for 3D printing.

BACKGROUND

Condensation polymers have been used to form shaped articles by traditional methods such as extrusion, film blowing, injection molding and the like. In these processes, the polymer is melted and substantially sheared resulting in cleaving of the polymer and uncontrolled loss of molecular weight causing deformation during forming of the shape (e.g., blow molded bottes and extruded tubes). Typically, a chain extender is added to reconstitute the molecular weight loss to realize sufficiently high melt strength and melt viscosity as described for polyester and polyethylene terephthalate in U.S. Pat. Nos. 4,246,378 and 7,544,387 respectively.

Additive manufacturing of thermoplastic polymers typically requires localized melting in layered patterns that then fuses and supports subsequent layers. Fused filament fabrication (FFF), which is also commonly called plastic jetprinting has been used to form 3d parts by using thermo plastic filaments that are drawn into a nozzle heated, melted and then extruded where the extruded filaments fuse together upon cooling (see, for example, U.S. Pat. Nos. 5,121,329 and 5,503,785).

Likewise, selective laser sintering or melting (SLS or SLM) has been used to make 3d parts by selectively sintering powders in a bed of powder (see, for example, U.S. Pat. No. 5,597,589). In this method, a bed of powder maintained at elevated temperatures is selectively sintered using a $CO_2$ laser or other electromagnetic radiation source. Once a first layer has been sintered, a further layer of powder is metered out and the selective sintering repeated until the desired 3d part is made. Since the powder must be sintered or melted, SLS has been limited by the need for complex apparatus and use of thermoplastic polymers with very particular characteristics to allow for sintering without warping, slumping and achieving desired fusing particularly between layers. This generally has limited the applicability mostly to polyamides (i.e., nylon) or composite powders containing nylon.

However, due to the localized heating and requirement of fusing to subsequent layers and within layers standard type thermoplastic polymers such as polyamides have limited the print speeds due to low melt flows, for example, to realize sufficient bonding within the layer and between layers without deformation or slumping. Because of rheological properties (e.g., low melt flows) the ability to load the SLS thermoplastic particles or FFF filaments with other constituents (e.g., inorganic filler) to realize particular properties such as hardness and stiffness may be limited. And, since typical 3D manufacturing (FFF and SLS) does not involve significant shear such as encountered in injection molding the desirable rheological properties during processing may not occur from the cleaving and reconstitution upon cooling and absence of shear.

Accordingly, it would desirable to provide a condensation polymer that is uniquely adapted to the problems of such polymers when used to 3D print parts.

SUMMARY

It has been discovered that condensation polymers such as polyamides and polyester may be formed having desirably melt rheological properties allowing for improved fusing of the polymer within and between layers. The process allows, for example, the reduction of the weight average molecular weight while still retaining a desirable amount of high molecular weight fraction realizing the desired enhanced melt rheological behavior while also retaining the desirable properties of the higher molecular weight fraction.

A first aspect of the invention is a method of forming an end capped condensation polymer useful for additive manufacturing comprising:
(i) heating a condensation polymer in the presence of an end capping compound to form cleaved condensation polymer, and,
(ii) reacting at least a portion of the cleaved condensation polymer with the end capping compound to form the end capped condensation polymer. In an embodiment, sufficient heating may be realized by imparting a sufficient amount of mechanical energy to the condensation polymer such as provided by a twin screw compounding extruder.

A second aspect of the invention is a method of forming an article comprised of fusing layers of the end capped condensation polymer made by the first aspect of the invention, the layers being sequentially deposited and fused by directed application of heating via an additive manufacturing method.

A third aspect of the invention is an article comprised of an end capped condensation polymer made by the method of the first or second aspect of this invention.

A fourth aspect of this invention is a polymer comprised of a condensation polymer end capped with the residue of an end capping compound.

DETAILED DESCRIPTION

The explanations and illustrations presented herein are intended to acquaint others skilled in the art with the invention, its principles, and its practical application. The specific embodiments of the present disclosure as set forth are not intended to be exhaustive or limit the scope of the disclosure.

The method of the invention forms an end capped polymer useful for additive manufacturing by heating a condensation polymer in the presence of an end capping compound to form cleaved polymer condensation polymer. A second aspect of the invention is a method of forming an article comprised of fusing layers of the end capped condensation polymer made by the first aspect of the invention, the layers being sequentially deposited and fused by directed application of heating via an additive manufacturing method.

The condensation polymer may be any suitable condensation polymer such as those known in the art and commercially available. Examples of useful polymers include a polyamide, polyester, polycarbonate, polyamideimide, polyimide, polyacetal or combination thereof. Desirably, the polymer is a polyamide, polyester, or polycarbonate. The condensation polymer may be linear or branched. Desirably, the condensation polymer is linear. Examples of polyamides include those available from Ube Industries Ltd., such as types Polyamide 6, Co polyamide (6/66), Co-polyamide (6/66/12), and Co-polyamide (6/12). Examples of polyesters include polyethylene terephthalate and other commercial polyesters such as those available from Celanese under the tradename CELANEX. Examples of polycarbonate include those available from Trinseo S. A. under the tradename CALIBRE.

The end capping compound may be any useful for reacting and end capping the cleaved condensation polymer and may vary depending on the particular condensation polymer. Examples of end capping compounds include those that are comprised of an epoxide, carboxylic acid, alcohol, anhydride, amines, isocyanate, aziridine, oxazoline, or phosphite ester. Desirably the end capping compound is an anhydride or carboxylic acid. Examples of anhydrides, which are particularly useful for end capping polyamides and polyimides, include phthalic anhydride, tetrabromophthalic anhydride, hexahydrophthalic anhydride, sulfophthalic anhydride, Trimellitic anhydride, 1,8-Naphthalic anhydride. In an embodiment, the end capping agent may introduce useful chemical groups that impart a desired property or characteristic such as flame retardance, UV resistance or other functionality such as capability of undergoing further reactions with differing polymers or reactive groups. For example, the end capping compound (e.g., anhydride) may have a variable functionality as follows. The end capping compounds (e.g., anhydride) may only react once with a polyamide once (functionality of 1), but have a functionality of 2 with a polyester, thus the end capping compound capping the polyamide may have a remaining functionality that allows it to react with a polyester if desired.

In an embodiment, the end capping compound is a liquid or a solid with a boiling temperature above the temperature used to heat and cleave the condensation polymer. To illustrate, the boiling temperature may desirably by at least about 250° C., 275° C., 300° C. or higher.

The amount of end capping agent may be any useful depending on the desired characteristics for the end capped condensation polymer. Typically, the amount may be from about 0.001%, 0.01%, 0.1% to about 5%, 3% or 1% by weight of the condensation polymer and end capping agent.

The heating may be to any useful temperature and may be dependent on the particular condensation polymer to be end capped. Illustratively, the temperature may be from about 50° C. below or above the melt temperature of the condensation polymer. In an embodiment the heating may be to a temperature within about 40° C., 30° C., or 25° C. of the melt temperature of the condensation polymer. Illustratively, the temperature typically may be from about 150° C. or 200° C. to 300° C. or 250° C.

Any method useful for heating a condensation polymer and end capping agent may be employed such as those known for heating and blending polymers. When heating, it may be desirable to also impart shear to the polymer and end capping agent to mix and further facilitate the cleaving of the condensation polymer. In an embodiment, a heated single or twin screw extruder may be employed such as those known in the art. The amount of shear may be any useful to realize the cleaving and end capping desired in a particular apparatus. The extruder may be held at one temperature or have a gradient along the length of the extruder to facilitate the cleaving and end capping desired.

To aid in forming the end capped condensation polymer, by products that are formed during the end capping reaction such as water may be removed during at least a portion of the method. Any method may be used to remove such by-products including, for example, applying a vacuum.

To illustrate the method a polyamide is heated with an end capping agent represented by phthalic anhydride as shown below. From the illustrations, it is apparent that the end capping of a polyamide may result in the production of water that may be desirable to remove as described herein.

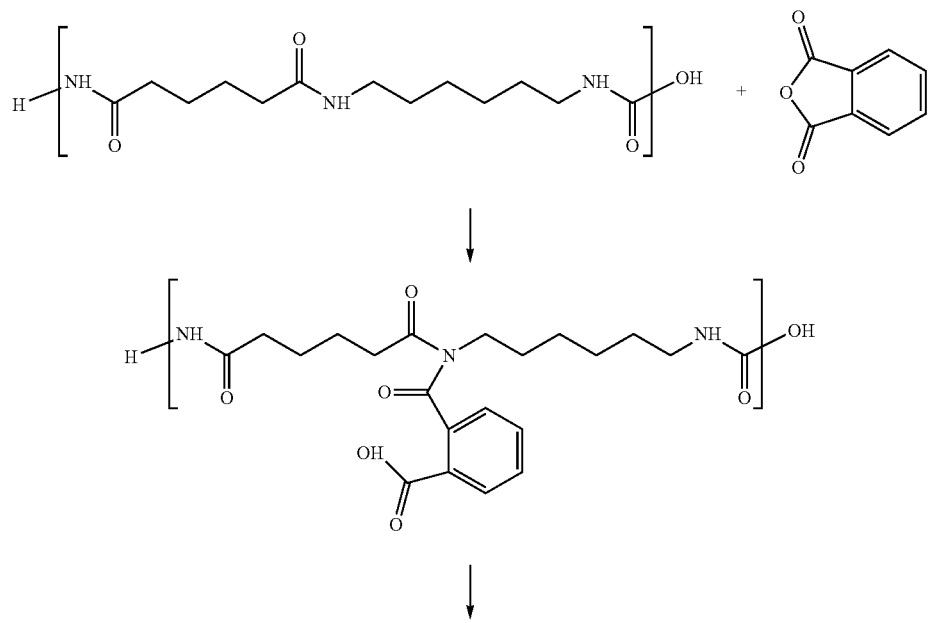

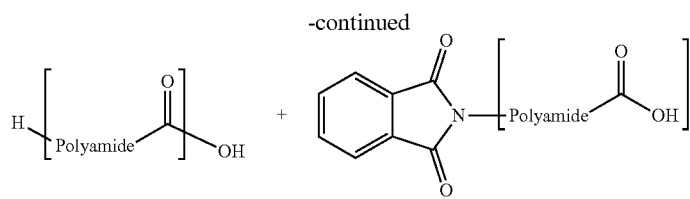
or
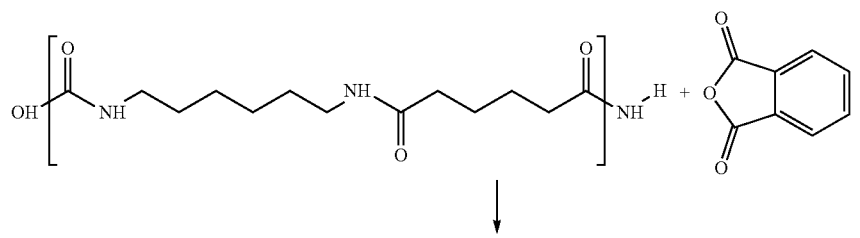
↓
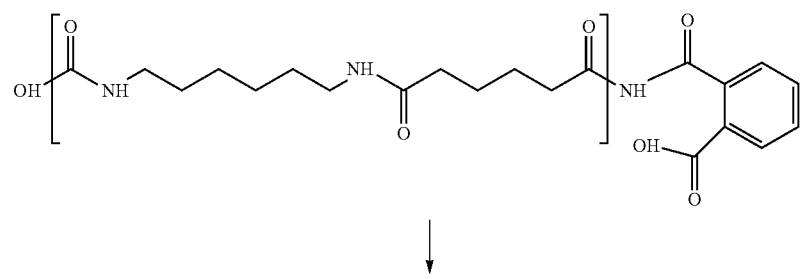
↓
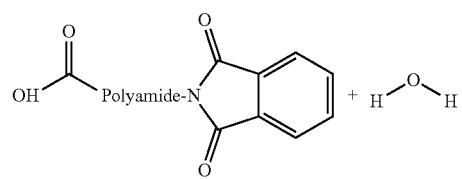

In another illustration a polyester may be end capped using a single functional alcohol end capping agent as shown below. In this example a 13 carbon branched alcohol under trade name EXXAL 13 was employed to produce chain scission in PET (polyethylene terephthalate). Because condensation reactions are reversible, the single functional alcohol is able to cleave the ester linkage resulting in a PET chain of reduced molecular weight and a short chain alcohol end capped PET chain. Since the EXXAL 13 does not have any additional functional groups, when the chain scission is completed no additional reactions occur.

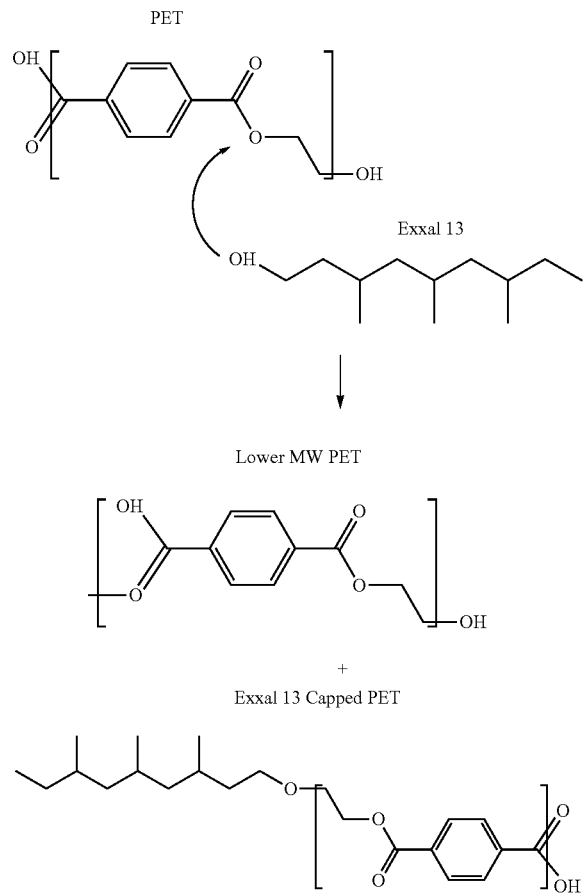

In contrast if the end capping agent phthalic anhydride is used for to end capping a polyester it acts as a chain extender building molecular weight instead of reducing molecular weight.

Various factors can affect the extent of molecular weight reduction that occurs in the method. For example, a concentration of the end capping reactant, a residence time in the extruder (e.g., a function of the screw speed), extruder temperature, moisture content of the polymer, pressure (e.g., a vacuum being pulled on the extruder), and/or shear rate in the extruder can affect the extent of molecular weight reduction. Slowing the extruder screw speed can increase the residence time that the polymer and end capping reactant have to react with each other, which can result in a lower average molecular weight as residence time is increased, until where all of the end capping reactant has reacted, for example. Increasing the concentration of an end capping reactant can also increase the statistical probability of an end capping reactant attaching to the reactive site of a cleaved polymer for a fixed residence time. Increased shear and temperature can increase the rate of chain scission that occurs within the extruder, thereby resulting in more cleaved molecules which can result in a lower average molecular weight when end capping reactant is present. One or more end capping reactants can be added sub-stoichiometrically (so that all of the end capping reactant or reactants are consumed by reaction), stoichiometrically, or in stoichiometric excess.

When performing the method, the end capped condensation polymer has a molecular weight average Mw that is less than the starting condensation polymer as well as an increased polydispersity and higher melt flow. Typically, the reduction in Mw and increase in polydispersity results in a condensation polymer Mw/end capped condensation polymer Mw that is greater than 1 and typically at least about 1.2, 1.5, 2 to up to 10 or 5. Likewise the increase in polydispersity results in a ratio of the end capped condensation polymer over the polydispersity of the condensation polymer greater than 1 and typically at least about 1.2, 1.5, 2 to up to 10 or 5.

The method is particularly useful for making low melt flow rate (MFR) condensation polymers having desirable melt flow rate and rheological properties to make melt blown and additive manufactured articles. Low melt flow rate at given temperature such as typically measured (e.g., 2.16 Kg @235° C. [grams/10 min] herein is less than about 10 or 5 (ASTM D1238). The method allows for the increase of the MFR of at least 2, 5, 10, 20 or even 50 times to any practically useful MFR (e.g., ~500 times). In an embodiment, the MFR of the end capped condensation polymer, at the above stated conditions, is at least about 10, 20, 30, 50, or even 75 to 200.

The end capped polymer may be mixed with any useful additives to make an article such as those known in the art. Illustratively, the end capped polymer may be mixed with further components that may be useful when making an article. Further components may be one or more dyes, pigments, toughening agents, rheology modifiers, fillers, reinforcing agents, thickening agents, opacifiers, inhibitors, fluorescence markers, thermal degradation reducers, thermal resistance conferring agents, surfactants, wetting agents, or stabilizers.

In an embodiment, the end capped condensation polymer is mixed with (e.g., melted and blended with filler). The filler may be any useful filler such as those known in the art. Examples of the filler ceramics, metals, carbon (e.g., graphite, carbon black, graphene), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumino silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof. In certain embodiments, the filler comprises an acicular filler such as talc, clay minerals, chopped inorganic glass, metal, or carbon fibers, mullite, mica, wollastanite or combination thereof. In a particular embodiment, the filler is comprised of talc.

The amount of filler may be any useful amount for making an article such as an additive manufactured article. For example, the filler may be present in an amount from 20%, 30%, 40% or 50% to 90% by weight of the end capped polymer and filler. It has been discovered that because of the ability to realize higher MFRs and desirable rheology that higher loadings of filler may be utilized while still realizing good print behavior of condensation polymers such as polyamides.

In an embodiment, the end capped polymer is formed into a powder or filament useful for additive manufacturing such as SLS or FFF, which is then used to make an additive manufactured article comprised of the end capped condensation polymer.

ILLUSTRATIVE EMBODIMENTS

The following examples are provided to illustrate the method and the polymers formed by them but are not intended to limit the scope thereof. All parts and percentages are by weight unless otherwise noted.

Each of the examples and comparative examples were performed in a 27 mm twin screw extruder/compounder at 400 revolutions per minute loaded at 60 pounds per hour with the noted polyamide, end capping compound and concentration of the end capping compound detailed for the examples as shown below. The extruder had a length/diameter ratio of 40 and the temperature was between 280° C. and 240° C. along the length of the extruder from input to exit through the die (i.e., somewhat linear gradient from beginning to end). A pressure (vacuum) was maintained at about 800 millibar.

Example 1 (A to D) and Comparative Example 1

In these examples and comparative example, the polyamide used is UBE 6434 type 6/66/12. The end capping compound is phthalic anhydride as shown in table 1 as is the MFR of each of the examples and comparative example.

TABLE 1

|  | C. Ex. 1 | Ex. 1A | Ex. 1B | Ex. 1C | Ex. 1D |
|---|---|---|---|---|---|
| Phthalic Anhydride [wt %] | 0 | 0.71 | 1.11 | 1.35 | 1.5 |
| Melt Flow (2.16 kg @ 235° C.) [g/10 min] | 1.74 | 16.07 | 34.88 | 51.00 | 62.95 |

Example 2 (A to D) and Comparative Example 2

In these examples and comparative example, the polyamide used is UBE 6434 type 6/66/12. The end capping compound is hexahydrophthalic anhydride as shown in table 2 as is the MFR of each of the examples and comparative example.

TABLE 2

|  | C. Ex. 2 | Ex. 2A | Ex. 2B | Ex. 2C | Ex. 2D |
|---|---|---|---|---|---|
| HexahydroPhthalic Anhydride [wt %] | 0 | 0.8 | 1.11 | 1.35 | 1.54 |
| Melt Flow (2.16 kg @ 235° C.) [g/10 min] | 1.93 | 13.20 | 32.03 | 39.95 | 52.58 |

Example 3 (A to D) and Comparative Example 3

In these examples and comparative example, the polyamide used is UBE 6434 type 6/66/12. The end capping compound is trimellitic anhydride as shown in table 3 as is the MFR of each of the examples and comparative example. Even when the polyamide is branched as in this example, the method is effective at realizing the desired MFRs.

TABLE 3

|  | C. Ex. 3 | Ex. 3A | Ex. 3B | Ex. 3C | Ex. D |
|---|---|---|---|---|---|
| Trimellitic Anhydride [wt %] | 0 | 0.7 | 1.0 | 1.3 | 1.5 |
| Melt Flow (2.16 kg @ 235° C.) [g/10 min] | 1.928 | 11.39 | 19.36 | 57.41 | 80.87 |

Example 4 (A to D) and Comparative Example 4

In these examples and comparative example, the polyamide used is RILSAN Polyamide 11 (Arkema). The end capping compound is hexahydrophthalic anhydride as shown in table 4 as is the MFR of each of the examples and comparative example. The MFR for the examples were too high to measure. It is not entirely understood why the MFR increased so rapidly, but may be because, without being limiting in anyway, of the presence of residual monomer acting as a further plasticizer.

TABLE 4

|  | C. Ex. 4 | Ex. 4A | Ex. 4B | Ex. 4D |
|---|---|---|---|---|
| HexahydroPhthalic Anhydride [wt %] | 0 | 0.8 | 1.1 | 1.4 |
| Melt Flow (2.16 kg @ 235° C.) [g/10 min] | 10.46 |  |  |  |

Example 5 (A to C) and Comparative Example 1

In these examples and comparative example, the polyamide used is NYLENE 615NP PA6 (Nylene Polymer Solutions). The end capping compound is hexahydrophthalic anhydride as shown in table 5 as is the MFR of each of the examples and comparative example.

TABLE 5

|  | C. Ex. 5 | Ex. 5A | Ex. 5B | Ex. 5C |
|---|---|---|---|---|
| HexahydroPhthalic Anhydride [wt %] | 0 | 0.8 | 1.1 | 1.4 |
| Melt Flow (2.16 kg @ 235° C.) [g/10 min] | 16.10 | 64.60 | 95.24 | 141.78 |

Example 6 (A to C) and Comparative Example 6

In these examples and comparative example, the polyamide used is Shadong Guangyin type PA 1012. The end capping compound is hexahydrophthalic anhydride as shown in table 6 as is the MFR of each of the examples and comparative example.

TABLE 6

Example 6 (A to C) and Comparative Example 6:

|  | C. Ex. 6 | Ex. 6A | Ex. 6B | Ex. 6C |
|---|---|---|---|---|
| HexahydroPhthalic Anhydride [wt %] | 0 | 0.8 | 1.1 | 1.4 |
| Melt Flow (2.16 kg @ 235° C.) [g/10 min] | 13.84 | 165.25 | 193.38 | N/A |

In this example and comparative example the polyamide used is EMS Grilamid L16 nat PA12 (EMS-Grivory). The end capping compound is phthalic anhydride as shown in table table 7 as is the MFR measured of the end capped polyamide.

TABLE 7

|  | C. Ex. 7 | Ex. 7A | Ex. 7B | Ex. 7C |
|---|---|---|---|---|
| HexahydroPhthalic Anhydride [wt %] | 0 | 0.8 | 1.1 | 1.4 |
| Melt Flow (2.16 kg @ 235° C.) [g/10 min] | 26.63 | 90.91 | 104.10 | 133.30 |

What is claimed is:

1. A method of forming an end capped condensation polymer comprising:
   (i) heating a linear or branched polyamide polymer having a melt flow of at most 5 grams/10 min (2.16 kg @235° C.) in the presence of at least one end capping compound, wherein each end capping compound has a functionality of 1 to form a cleaved condensation polymer, and
   (ii) reacting at least a portion of the cleaved condensation polymer with the end capping compound to form the end capped condensation polymer, wherein the end capped condensation polymer has a melt flow rate of 10 to 200 grams/10 min (2.16 kg @ 235° C.) and is at least 5 times greater than the melt flow of the linear or branched polyamide.

2. The method of claim 1, wherein the at least one end capping compound is selected from the group consisting of an epoxide, carboxylic acid, alcohol, anhydride, amine, isocyanate, aziridine, oxazoline, phosphite ester, and combinations thereof.

3. The method of claim 2, wherein the at least one end capping compound is an anhydride or carboxylic acid.

4. The method of claim 3, wherein the at least one end capping compound is the anhydride.

5. The method of claim 4, wherein the polyamide is a 6/66/12 co-polyamide.

6. The method of claim 1, wherein the end capped condensation polymer has a higher polydispersity than the linear or branched polyamide such that a ratio of the polydispersity of the end capped condensation polymer to the polydispersity of the linear or branched polyamide is at least 1.2.

7. The method of claim 6, wherein the end capped condensation polymer has a melt flow rate of at least 30 grams/10 min (2.16 kg @ 235° C.).

8. The method of claim 7, wherein the end capped condensation polymer has a melt flow rate of at least 50 grams/10 min (2.16 kg @ 235° C.).

9. The method of claim 8, wherein the end capped condensation polymer has a melt flow rate of at least 75 grams/10 min (2.16 kg @ 235° C.).

10. The method of claim 1, further comprising adding a filler to the end capped condensation polymer wherein the filler is added in an amount of 20% to 90% by weight based on the combined weight of the end capped condensation polymer and filler.

11. The method of claim 1, wherein the end capped condensation polymer has a melt flow rate that is at least 10 times greater than the melt flow of the linear or branched polyamide.

12. The method of claim 1 further comprising shearing the condensation polymer during heating.

13. The method of claim 12, wherein the heating is performed in a screw extruder.

14. The method of claim 1 further comprising removing water during at least a portion of the method.

15. The method of claim 14, wherein water is removed by performing the method under a reduced pressure.

16. The method of claim 1, wherein the at least one end capping compound is selected from the group consisting of tetrabromophthalic anhydride, hexahydrophtalic anhydride, 1,8-naphthalic anhydride, phthalic anhydride, and combinations thereof.

17. The method of claim 1, wherein the at least one end-capping compound is present in an amount of 0.01% to 5% by weight of the condensation polymer and end capping compound.

18. A method of forming an article comprised of fusing layers of the end capped condensation polymer made by the method of claim 1, the layers being sequentially deposited and fused by directed application of heating via an additive manufacturing method.

19. The method of claim 18, wherein the additive manufacturing method is SLS or FFF and the end capped condensation polymer has a filler in an amount of at least 50% to 90% by weight of the polymer and filler.

20. The method of claim 1, further comprising adding a filler to the end capped condensation polymer wherein the filler is added in an amount of 20% to 40% by weight based on the combined weight of the end capped condensation polymer and filler.

* * * * *